United States Patent
Shyu

(10) Patent No.: US 6,523,498 B1
(45) Date of Patent: Feb. 25, 2003

(54) AQUARIUM HAVING A POWERLESS AIR PUMPING DEVICE

(76) Inventor: Shin-Fa Shyu, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/124,695

(22) Filed: Apr. 10, 2002

(51) Int. Cl.[7] .............................................. A01K 63/04
(52) U.S. Cl. ....................... 119/259; 119/261; 119/263
(58) Field of Search ................... 119/259, 260, 119/261, 263, 264; 210/169

(56) References Cited

U.S. PATENT DOCUMENTS

| | | | |
|---|---|---|---|
| 4,151,810 A | * | 5/1979 | Wiggins ..................... 119/262 |
| 5,081,954 A | * | 1/1992 | Monus ........................ 119/260 |
| 5,536,398 A | * | 7/1996 | Reinke ........................ 210/169 |
| 6,044,903 A | * | 4/2000 | Heilman et al. ............. 165/263 |

* cited by examiner

Primary Examiner—Yvonne Abbott

(57) ABSTRACT

An aquarium having a powerless air pumping device includes a cycle filter device, and an air pumping device. The cycle filter device includes a water pumping pipe connecting with the air pumping device, so that the motor and the water pumping pipe of the cycle filter device may pump the water contained in the aquarium into the air pumping device, to serve as the power source of the powerless air pumping device.

6 Claims, 5 Drawing Sheets

US 6,523,498 B1

AQUARIUM HAVING A POWERLESS AIR PUMPING DEVICE

BACKGROUND OF THE INVENTION

1. Field of the Invention

The present invention relates to an aquarium having a powerless air pumping device, and more particularly to an aquarium having a powerless air pumping device, wherein the compressor may be compressed and expanded successively to drain out the air contained in the air chamber, so that the air bubbles may be produced without needing to connect an external electrical power, so as to provide the oxygen required by the aquarium.

2. Description of the Related Art

A conventional aquarium in accordance with the prior art comprises a cycle filter device for cyclically filtering dirt or residuals contained in the aquarium, and an air pumping device for increasing the oxygen contents contained in the water. However, both of the cycle filter device and the air pumping device need to use the electrical power, thereby wasting the electrical power.

SUMMARY OF THE INVENTION

The primary objective of the present invention is to provide an aquarium having a powerless air pumping device, wherein the compressor may be compressed and expanded successively to drain out the air contained in the air chamber, so that the air bubbles may be produced without needing to connect an external electrical power, so as to provide the oxygen required by the aquarium.

In accordance with the present invention, there is provided an aquarium having a powerless air pumping device, comprising a cycle filter device, and an air pumping device, the cycle filter device including a water pumping pipe connecting with the air pumping device, so that the motor and the water pumping pipe of the cycle filter device may pump the water contained in the aquarium into the air pumping device, to serve as the power source of the powerless air pumping device, the powerless air pumping device comprising a seat, a cover, a bottom plate, an impeller, a rotation disk, an eccentric shaft, a control board, two opposite compressors, and two opposite air chambers, wherein:

the seat is formed with a circular receiving recess, and the bottom plate is provided with an annular positioning flange mounted in the circular receiving recess of the seat, the impeller is pivotally mounted in the circular receiving recess and the annular positioning flange, the seat has a wall provided with a water inlet pipe and a water outlet pipe which are connected to the water pumping pipe of the cycle filter device, so that the cyclically filtered water flow may enter the seat from the water inlet pipe to drive and rotate the impeller, and may be drained outward from the water outlet pipe into the water pumping pipe of the cycle filter device;

the control board has a periphery formed with two retaining slots, and the seat has a periphery provided with two positioning posts each respectively extended through the two retaining slots of the control board;

the rotation disk is mounted on the rotation shaft of the impeller;

the eccentric shaft is eccentrically mounted on the rotation disk;

the control board has a center formed with a drive slot, and the eccentric shaft is extended through the drive slot of the control board, so that when the rotation disk is rotated, the eccentric shaft may be moved to drive the control board to move reciprocally, the control board has two opposite sides each provided with a forked pivot ear which is formed with a pivot hole;

each of the two compressors has a first end provided with a connecting portion which is pivotally mounted on the pivot ear of each of the two opposite sides of the control board, each of the two compressors has a second end provided with a mounting portion mounted in a mounting portion of each of the two air chambers;

each of the two air chambers is provided with an one-way air inlet valve and an one-way air outlet valve, each of the one-way air inlet valve and the one-way air outlet valve is provided with an elastic member and a plug to block an air inlet tube and an air outlet tube, so that the one-way air inlet valve may input air in an one-way manner, and the one-way air outlet valve may output air in an one-way manner, the air inlet tube is connected to the outside of the aquarium by a conducting pipe; and the cover has two opposite ends each provided with an elongated opening for receiving the water inlet pipe and the water outlet pipe of the seat, and the air drained outward from the air outlet tube may be drained outward from the gap of the elongated opening of the cover.

Further benefits and advantages of the present invention will become apparent after a careful reading of the detailed description with appropriate reference to the accompanying drawings.

DETAILED DESCRIPTION OF THE INVENTION

Figure 1:
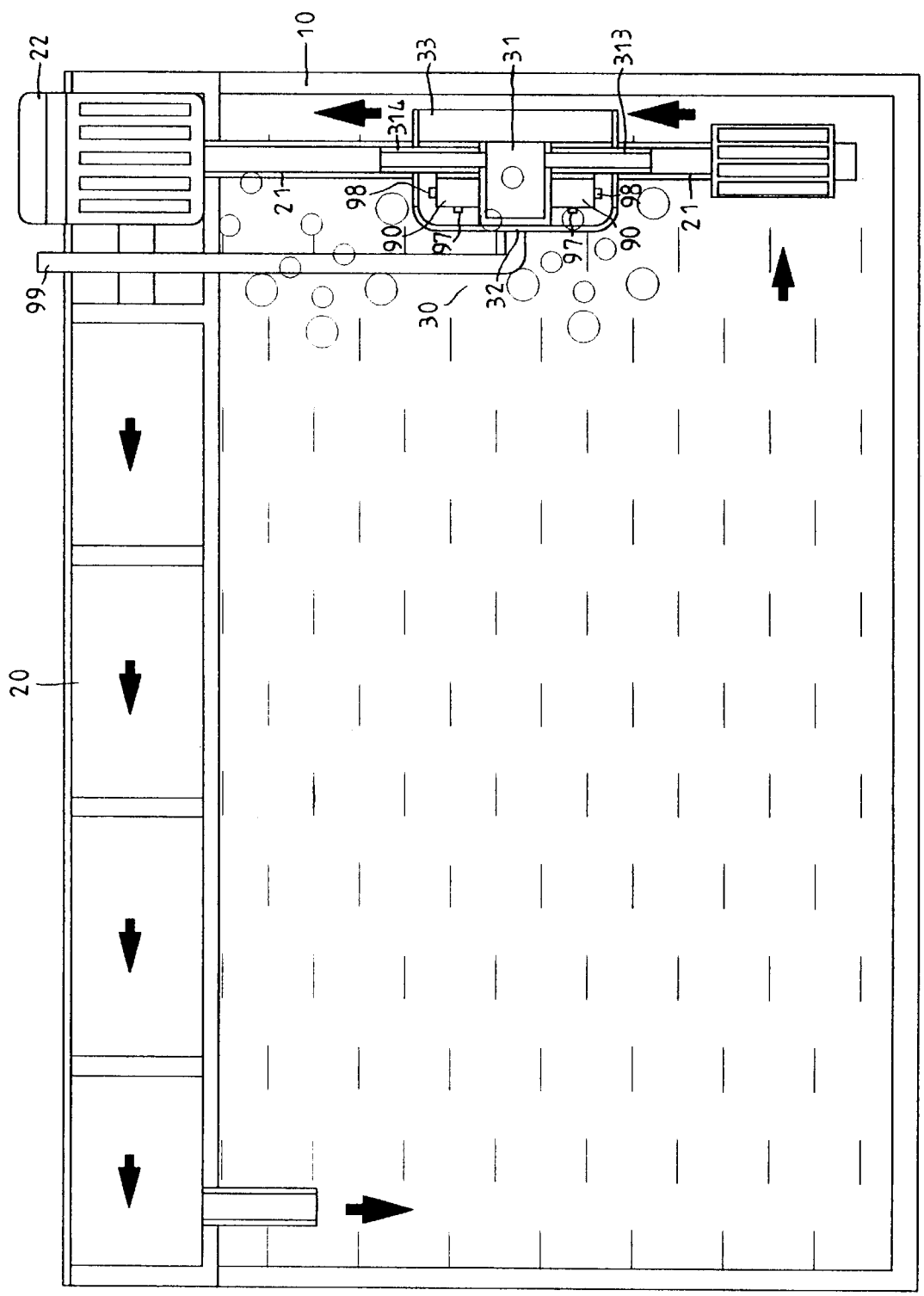
FIG. 1 is a schematic plan view of an aquarium having a powerless air pumping device in accordance with a preferred embodiment of the present invention.
Figure 2:
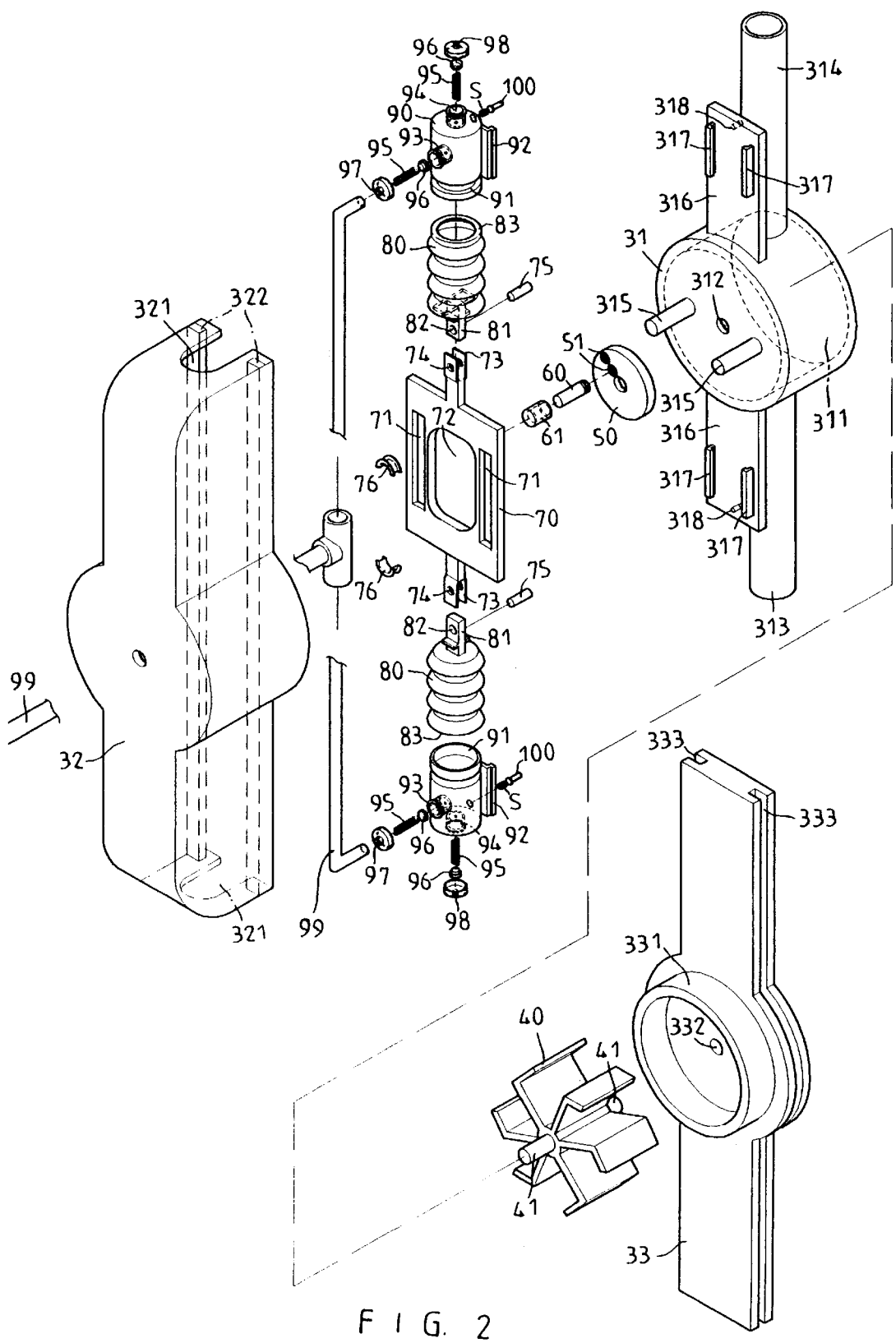
FIG. 2 is an exploded perspective assembly view of the powerless air pumping device in accordance with the preferred embodiment of the present invention.

Referring to the drawings and initially to FIGS. 1 and 2, an aquarium 10 having a powerless air pumping device in accordance with a preferred embodiment of the present invention comprises a cycle filter device 20, and an air pumping device 30.

The cycle filter device 20 includes a water pumping pipe 21 connecting with the air pumping device 30. Thus, the motor 22 and the water pumping pipe 21 of the cycle filter device 20 may pump the water contained in the aquarium 10 into the air pumping device 30, to serve as the power source of the powerless air pumping device 30 in accordance with the preferred embodiment of the present invention.

The powerless air pumping device 30 in accordance with the preferred embodiment of the present invention comprises a seat 31, a cover 32, a bottom plate 33, an impeller 40, a rotation disk 50, an eccentric shaft 60, a control board 70, two opposite compressors 80, and two opposite air chambers 90.

The seat 31 is formed with a circular receiving recess 311, and the bottom plate 33 is provided with an annular positioning flange 331 mounted in the circular receiving recess 311 of the seat 31.

The seat 31 has a center formed with a shaft hole 312, and the bottom plate 33 has a center formed with a shaft hole 332 aligning with the shaft hole 312 of the seat 31, so that one end of the rotation shaft 41 of the impeller 40 may extend through the shaft hole 312 of the seat 31 and the other end of the rotation shaft 41 of the impeller 40 may extend through the shaft hole 332 of the bottom plate 33.

The seat 31 has a wall provided with a water inlet pipe 313 and a water outlet pipe 314 which are connected to the water pumping pipe 21 of the cycle filter device 20, so that the cyclically filtered water flow may enter the seat 31 from the water inlet pipe 313 to drive and rotate the impeller 40, and may then be drained outward from the water outlet pipe 314 into the water pumping pipe 21 of the cycle filter device 20.

The control board 70 has a periphery formed with two retaining slots 71, and the seat 31 has a periphery provided with two positioning posts 315 each respectively extended through the two retaining slots 71 of the control board 70.

The rotation disk 50 is mounted on the rotation shaft 41 of the impeller 40, and is formed with multiple screw bores 51 which are eccentrically distant from the center of the rotation disk 50. Thus, the eccentric shaft 60 may be selectively mounted in one of the multiple eccentric screw bores 51 of the rotation disk 50 according to the water pumping capacity of the motor 22 of the cycle filter device 20.

The control board 70 has a center formed with a drive slot 72, and the eccentric shaft 60 is extended through the drive slot 72 of the control board 70, so that when the rotation disk 50 is rotated, the eccentric shaft 60 may be moved to drive the control board 70 to move reciprocally.

In addition, the eccentric shaft 60 is provided with a bushing 61, and the drive slot 72 of the control board 70 is provided with multiple bushings 76, thereby reducing noise.

The control board 70 has two opposite sides each provided with a forked pivot ear 73 which is formed with a pivot hole 74.

Each of the two compressors 80 is made of a soft material, and has a first end provided with a connecting portion 81 which is made of a hard material and is pivotally mounted on the pivot ear 73 of each of the two opposite sides of the control board 70. The connecting portion 81 of each of the two compressors 80 is formed with a connecting hole 82 aligning with the pivot hole 74 of the pivot ear 73 of each of the two opposite sides of the control board 70 for passage of a pivot pin 75, so that the first end of each of the two compressors 80 may be pivotally mounted on the pivot ear 73 of each of the two opposite sides of the control board 70.

Each of the two compressors 80 has a second end provided with a mounting portion 83 mounted in a mounting portion 91 which is provided on each of the two air chambers 90.

The wall of the seat 31 is provided with two opposite fixing plates 316 each provided with two L-shaped combination rails 317 and each formed with a positioning hole 317. Each of the two air chambers 80 is secured on each of the two opposite fixing plates 316 of the seat 31, and has a wall provided with two L-shaped combination blocks 92 locked in the two L-shaped combination rails 317 of each of the two opposite fixing plates 316 of the seat 31. Each of the two air chambers 80 is provided with a positioning stub 100 secured in the positioning hole 318 of each of the two opposite fixing plates 316 of the seat 31. The positioning stub 100 of each of the two air chambers 80 is provided with a spring "S", so that the positioning stub 100 may have an elastic positioning effect.

Each of the two air chambers 80 is provided with an one-way air inlet valve 93 and an one-way air outlet valve 94. Each of the one-way air inlet valve 93 and the one-way air outlet valve 94 is provided with an elastic member 95 and a plug 96 to block an air inlet tube 97 and an air outlet tube 98, so that the one-way air inlet valve 93 may input air in an one-way manner, and the one-way air outlet valve 94 may output air in an one-way manner. The air inlet tube 97 is connected to the outside of the aquarium 10 by a conducting pipe 99. The diameter of the air inlet tube 97 is preferably greater than that of the air outlet tube 98, so that the compressor 80 may be rapidly returned to an expansion air inlet state after compression.

The cover 32 has two opposite ends each provided with an elongated opening 321 for receiving the water inlet pipe 313 and the water outlet pipe 314 of the seat 31. At the same time, the air drained outward from the air outlet tube 98 may be drained outward from the gap of the elongated opening 321 of the cover 32.

The bottom plate 33 has two opposite sides each formed with a combination channel 333, and the cover 32 has a periphery provided with two opposite combination blocks 322 each received in the combination channel 333 of the bottom plate 33, so that the cover 32 may be combined with the bottom plate 33.

Figure 3:
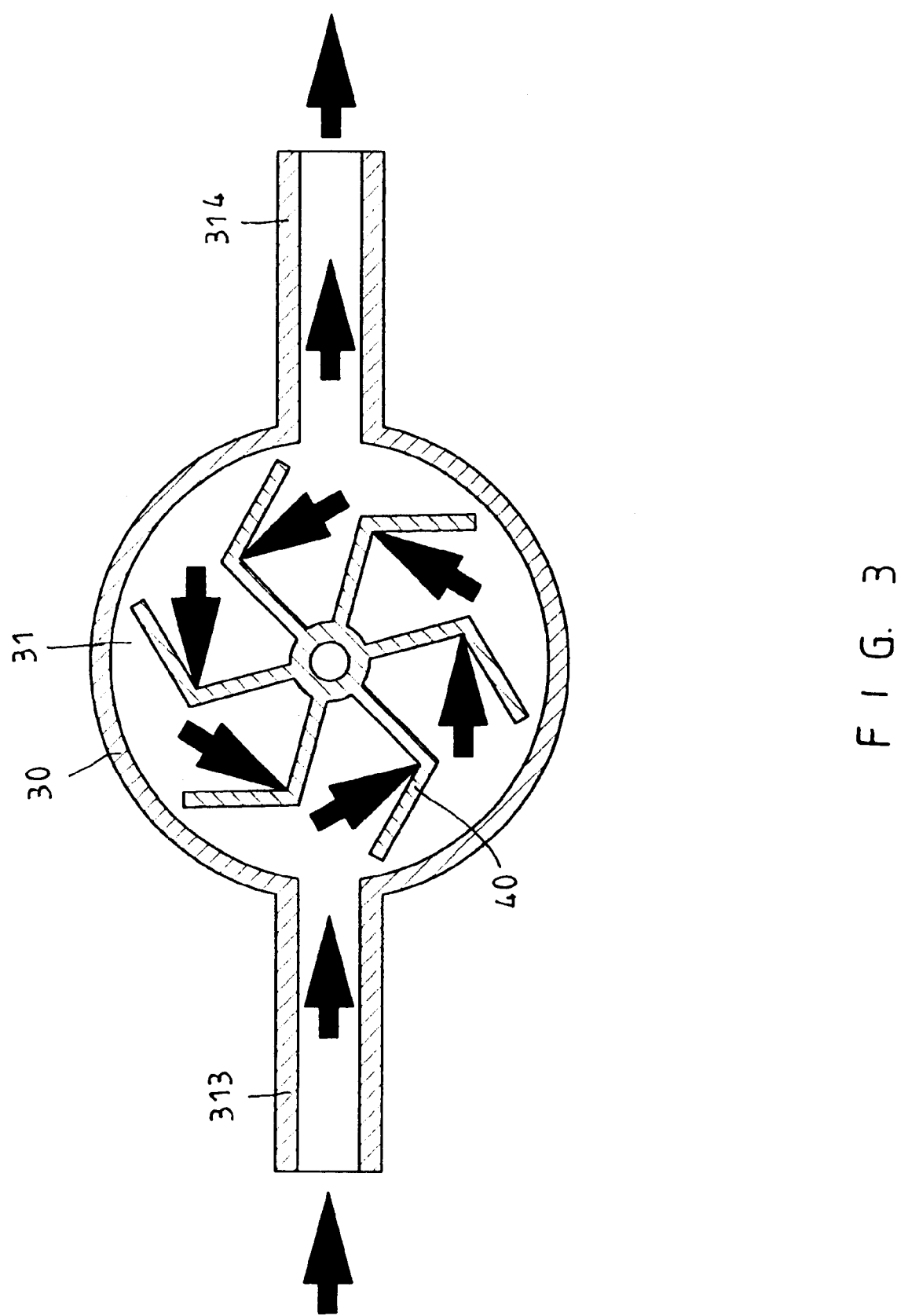
FIG. 3 is a plan cross-sectional assembly view of the powerless air pumping device as shown in FIG. 2.

Referring to FIG. 3, the water may be pumped by the motor 22 of the cycle filter device 20 to flow through the water pumping pipe 21 of the cycle filter device 20, so that the cyclically filtered water flow may enter the seat 31 of the powerless air pumping device 30 from the water inlet pipe 313 to drive and rotate the impeller 40 in the receiving recess 311, thereby serving the power source of the powerless air pumping device 30.

Figure 4:
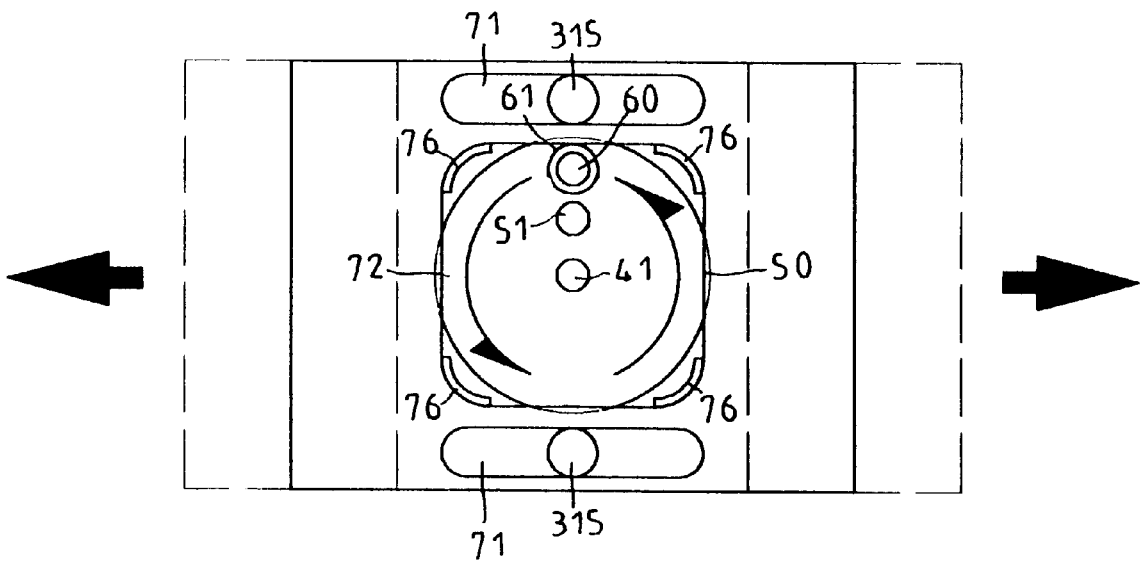
FIG. 4 is a plan assembly view of the powerless air pumping device as shown in FIG. 2.

Referring to FIG. 4, when the impeller 40 is rotated, the rotation disk 50 mounted on the rotation shaft 41 of the impeller 40 may also be rotated, so that the eccentric shaft 60 mounted in one of the multiple eccentric screw bores 51 of the rotation disk 50 may be rotated in an eccentric manner, thereby driving the control board 70 to move reciprocally.

Figure 5:
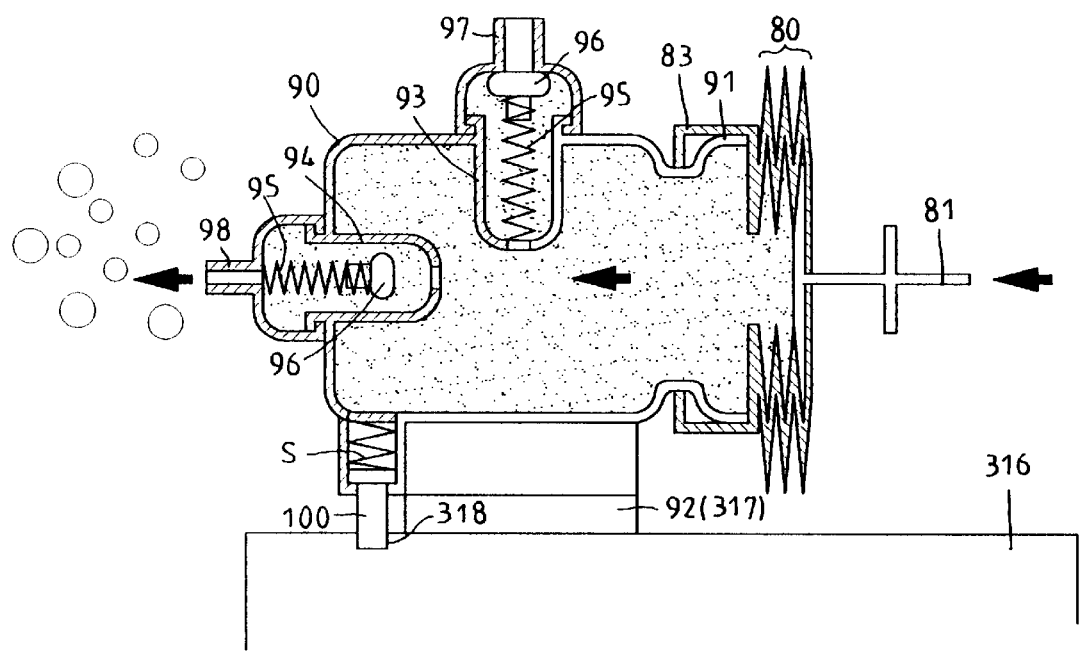
FIG. 5 is a partially cut-away plan cross-sectional assembly view of the powerless air pumping device as shown in FIG. 2.
Figure 6:
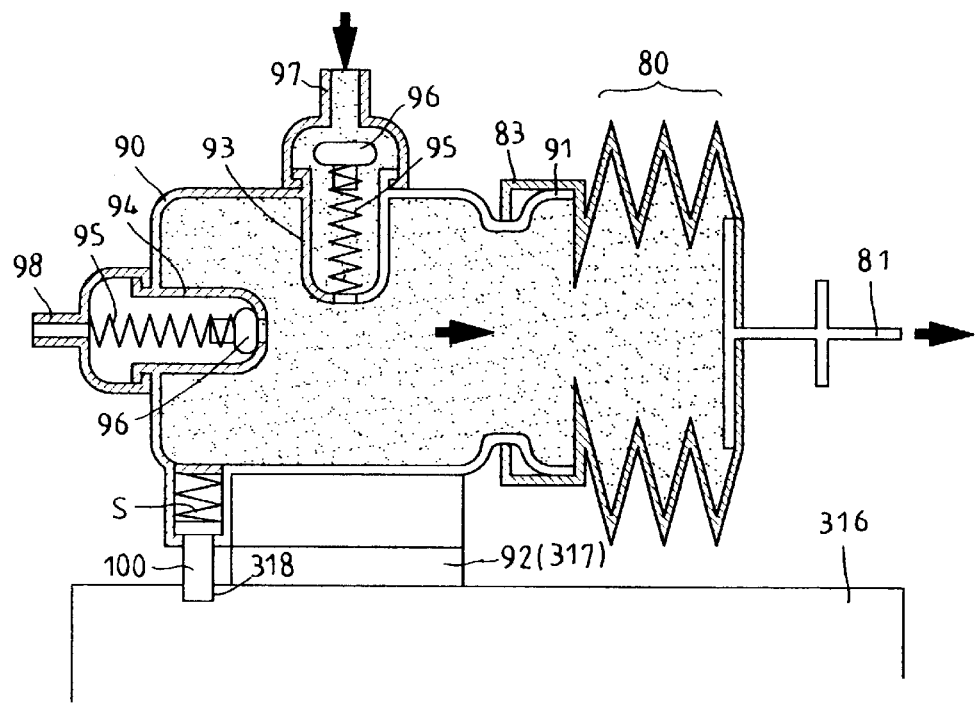
FIG. 6 is a schematic operational view of the aquarium having a powerless air pumping device as shown in FIG. 5 in use.

Referring to FIGS. 5 and 6, when the control board 70 is driven to move reciprocally, the two compressors 80 pivotally mounted on the control board 70 may be compressed to output the air and expanded to input the air successively. When the air is output, the air compressed in the air chamber 90 may open the plug 96 of the air outlet valve 94, so that the air may be drained outward from the air outlet tube 98. At the same time, the plug 96 of the air inlet valve 93 is closed. When the air is input, the ambient air will enter the air inlet tube 98 to open the plug 96 of the air inlet valve 93, so that the air may enter the air chamber 90 and may push the compressor 80 to return to the original expansion state. At the same time, the plug 96 of the air outlet valve 94 is closed.

Thus, the two compressors 80 may be compressed to output the air and expanded to input the air successively, thereby achieving the air pumping purpose, so that the air bubbles produced during the air outlet process may be conveyed from the gap of the elongated opening 321 of the cover 32 into the aquarium 10, so as to provide the necessary oxygen without needing to use the electrical power.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An aquarium having a powerless air pumping device, comprising a cycle filter device, and an air pumping device, the cycle filter device including a water pumping pipe connecting with the air pumping device, so that a motor and the water pumping pipe of the cycle filter device may pump the water contained in the aquarium into the air pumping device, to serve as the power source of the powerless air pumping device, the powerless air pumping device comprising a seat, a cover, a bottom plate, an impeller, a rotation disk, an eccentric shaft, a control board, two opposite compressors, and two opposite air chambers, wherein:

the seat is formed with a circular receiving recess, and the bottom plate is provided with an annular positioning flange mounted in the circular receiving recess of the seat, the impeller is pivotally mounted in the circular receiving recess and the annular positioning flange, the seat has a wall provided with a water inlet pipe and a water outlet pipe which are connected to the water pumping pipe of the cycle filter device, so that the cyclically filtered water flow may enter the seat from the water inlet pipe to drive and rotate the impeller, and may be drained outward from the water outlet pipe into the water pumping pipe of the cycle filter device;

the control board has a periphery formed with two retaining slots, and the seat has a periphery provided with two positioning posts each respectively extended through the two retaining slots of the control board;

the rotation disk is mounted on the rotation shaft of the impeller;

the eccentric shaft is eccentrically mounted on the rotation disk;

the control board has a center formed with a drive slot, and the eccentric shaft is extended through the drive slot of the control board, so that when the rotation disk is rotated, the eccentric shaft may be moved to drive the control board to move reciprocally, the control board has two opposite sides each provided with a forked pivot ear which is formed with a pivot hole;

each of the two compressors has a first end provided with a connecting portion which is pivotally mounted on the pivot ear of each of the two opposite sides of the control board, each of the two compressors has a second end provided with a mounting portion mounted in a mounting portion of each of the two air chambers;

each of the two air chambers is provided with a one-way air inlet valve and an one-way air outlet valve, each of the one-way air inlet valve and the one-way air outlet valve is provided with an elastic member and a plug to block an air inlet tube and an air outlet tube, so that the one-way air inlet valve may input air in an one-way manner, and the one-way air outlet valve may output air in an one-way manner, the air inlet tube is connected to the outside of the aquarium by a conducting pipe; and the cover has two opposite ends each provided with an elongated opening for receiving the water inlet pipe and the water outlet pipe of the seat, and the air drained outward from the air outlet tube may be drained outward from the gap of the elongated opening of the cover.

2. The aquarium having a powerless air pumping device in accordance with claim 1, wherein the diameter of the air inlet tube is greater than that of the air outlet tube, so that the compressor may be rapidly returned to an expansion air inlet state after compression.

3. The aquarium having a powerless air pumping device in accordance with claim 1, wherein the bottom plate has two opposite sides each formed with a combination channel, and the cover has a periphery provided with two opposite combination blocks each received in the combination channel of the bottom plate, so that the cover may be combined with the bottom plate.

4. The aquarium having a powerless air pumping device in accordance with claim 1, wherein the seat is provided with two opposite fixing plates each provided with two L-shaped combination rails and each formed with a positioning hole, each of the two air chambers is secured on each of the two opposite fixing plates of the seat, and has a wall provided with two L-shaped combination blocks locked in the two L-shaped combination rails of each of the two opposite fixing plates of the seat, each of the two air chambers is provided with a positioning stub secured in the positioning hole of each of the two opposite fixing plates of the seat, and the positioning stub of each of the two air chambers is provided with a spring, so that the positioning stub may be positioned in the positioning hole of each of the two opposite fixing plates of the seat in an elastic manner.

5. The aquarium having a powerless air pumping device in accordance with claim 1, wherein the rotation disk is formed with multiple screw bores which are eccentrically distant from the center of the rotation disk, so that the eccentric shaft may be selectively mounted in one of the multiple eccentric screw bores of the rotation disk according to the water pumping capacity of the motor of the cycle filter device.

6. The aquarium having a powerless air pumping device in accordance with claim 1, wherein the eccentric shaft is provided with a bushing, and the drive slot of the control board is provided with multiple bushings, thereby reducing noise.

* * * * *